United States Patent
Breuer et al.

(10) Patent No.: US 9,644,765 B2
(45) Date of Patent: May 9, 2017

(54) SYSTEM AND METHOD FOR MOUNTING AIRCRAFT SYSTEM COMPONENTS IN THE CROWN AREA OF AN AIRCRAFT

(71) Applicant: Airbus Operations GmbH, Hamburg (DE)

(72) Inventors: Matthias Breuer, Hamburg (DE); Wei-Chung Tuan, Hamburg (DE); Frank Klepka, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 88 days.

(21) Appl. No.: 14/444,098

(22) Filed: Jul. 28, 2014

(65) Prior Publication Data
US 2014/0332640 A1 Nov. 13, 2014

Related U.S. Application Data

(63) Continuation of application No. PCT/EP2013/051559, filed on Jan. 28, 2013.
(Continued)

(51) Int. Cl.
*F16L 3/26* (2006.01)
*B64C 1/06* (2006.01)
(Continued)

(52) U.S. Cl.
CPC ........ *F16L 3/26* (2013.01); *B64C 1/00* (2013.01); *B64C 1/064* (2013.01); *B64D 11/00* (2013.01); *B64F 5/0009* (2013.01); *B64D 2011/0046* (2013.01); *Y02T 50/46* (2013.01); *Y10T 29/49826* (2015.01)

(58) Field of Classification Search
CPC .... B64C 1/064; B64D 2011/0046; F16L 3/26; B64F 3/00
See application file for complete search history.

(56) References Cited

U.S. PATENT DOCUMENTS

| 6,536,710 B1 | 3/2003 | Bobzien et al. |
| 7,270,297 B2 * | 9/2007 | Schaefer et al. ........... 244/137.1 |

(Continued)

FOREIGN PATENT DOCUMENTS

| DE | 2132737 | 1/1973 |
| DE | 10206206 | 9/2003 |

(Continued)

OTHER PUBLICATIONS

International Search Report, Apr. 17, 2013.
German Office Action, Jan. 30, 2012.

*Primary Examiner* — Eret McNichols
(74) *Attorney, Agent, or Firm* — Greer, Burns & Crain Ltd.

(57) ABSTRACT

A system for mounting aircraft system components in the crown area of an aircraft comprising a first longitudinal carrier element, a second longitudinal carrier element and a bridging element which connects the first longitudinal carrier element to the second longitudinal carrier element. The system is mountable in the crown area of an aircraft in such a way that the first and the second longitudinal carrier elements extend substantially parallel to the longitudinal axis of the aircraft. A plurality of cable ducts for accommodating electrical lines is provided on the first and/or the second longitudinal carrier elements.

19 Claims, 10 Drawing Sheets

Related U.S. Application Data

(60) Provisional application No. 61/592,014, filed on Jan. 30, 2012.

(51) Int. Cl.
    *B64D 11/00*      (2006.01)
    *B64F 5/00*       (2017.01)
    *B64C 1/00*      (2006.01)

(56) References Cited

U.S. PATENT DOCUMENTS

| | | | |
|---|---|---|---|
| 7,455,263 B2 * | 11/2008 | Lau et al. | 244/118.5 |
| 7,516,919 B2 * | 4/2009 | Young et al. | 244/118.5 |
| 7,527,221 B2 * | 5/2009 | Humfeldt et al. | 244/118.5 |
| 8,474,758 B2 * | 7/2013 | Koefinger et al. | 244/120 |
| 8,794,569 B1 * | 8/2014 | Ohlmann et al. | 244/118.6 |
| 8,925,859 B2 * | 1/2015 | Huber et al. | 244/118.1 |
| 9,056,685 B2 * | 6/2015 | Umlauft et al. | |
| 9,090,327 B2 * | 7/2015 | Tomasi et al. | |
| 2009/0250554 A1 * | 10/2009 | Graeber et al. | 244/120 |
| 2009/0272576 A1 * | 11/2009 | Medina | 174/72 A |
| 2011/0255296 A1 * | 10/2011 | Hashberger et al. | 362/471 |
| 2012/0074258 A1 * | 3/2012 | Papke et al. | 244/118.5 |
| 2012/0124808 A1 * | 5/2012 | Landes et al. | 29/428 |
| 2013/0200213 A1 * | 8/2013 | Umlauft et al. | 244/129.1 |
| 2013/0277901 A1 * | 10/2013 | Moje et al. | 269/1 |
| 2013/0284868 A1 * | 10/2013 | Moje et al. | 248/205.1 |
| 2014/0292170 A1 * | 10/2014 | Lamey | 312/245 |

FOREIGN PATENT DOCUMENTS

| | | | | |
|---|---|---|---|---|
| DE | 102006016509 A1 * | 10/2007 | | B64D 11/00 |
| DE | 102008020789 A1 * | 11/2009 | | |
| DE | 102010055962 | 6/2012 | | |
| DE | 102010055995 | 6/2012 | | |
| DE | 102007019821 B4 * | 11/2012 | | |
| WO | 2012084204 | 6/2012 | | |

* cited by examiner

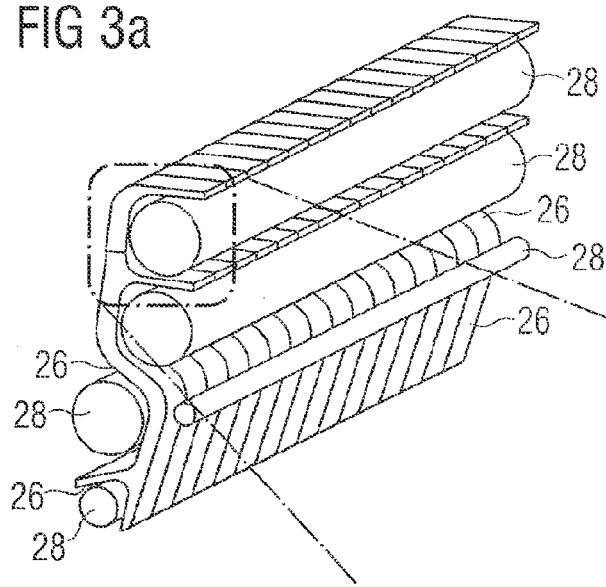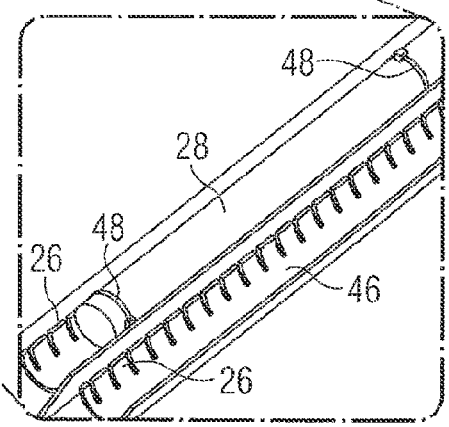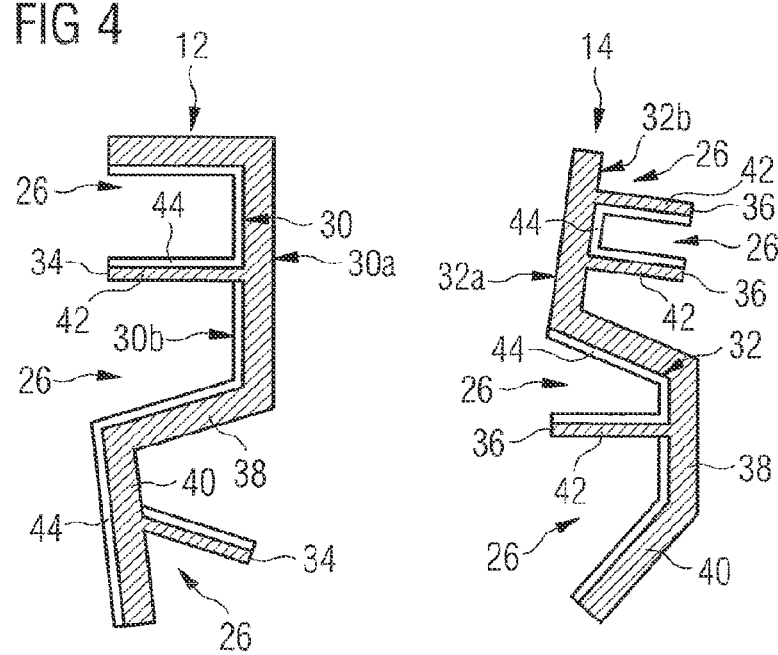

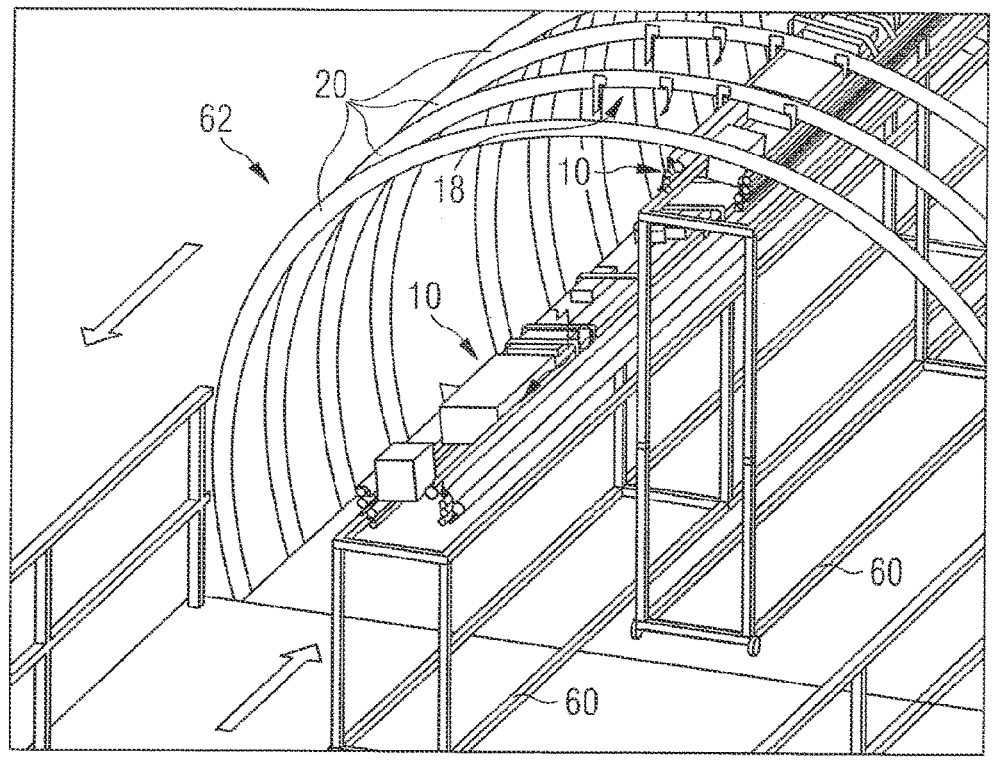
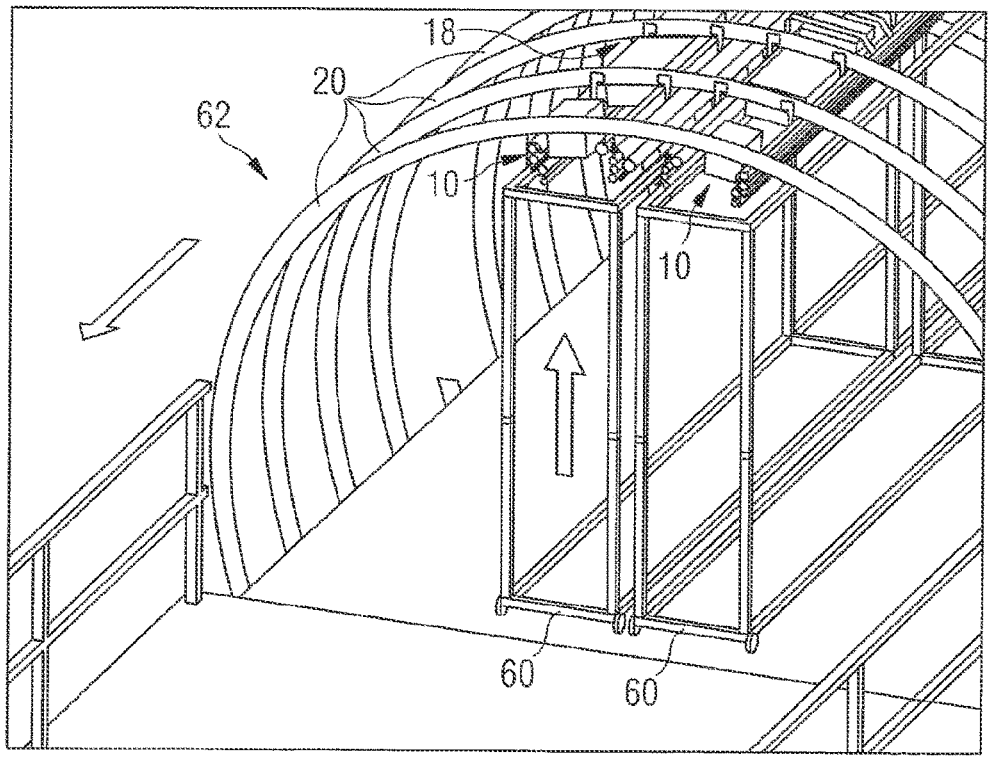

SYSTEM AND METHOD FOR MOUNTING AIRCRAFT SYSTEM COMPONENTS IN THE CROWN AREA OF AN AIRCRAFT

CROSS-REFERENCES TO RELATED APPLICATIONS

This application is a continuation of International Application PCT/EP2013/051559 filed Jan. 28, 2013, designating the United States and published on Aug. 8, 2013 as WO 2013/113650. This application also claims the benefit of the U.S. Provisional Application No. 61/592,014, filed on Jan. 20, 2012, and of the German patent application No. 10 2012 001 797.9, filed on Jan. 20, 2012, the entire disclosures of which are incorporated herein by way of reference.

BACKGROUND OF THE INVENTION

The invention relates to a system, and also to a method, for mounting aircraft system components in the crown area of an aircraft.

When mounting system components in the crown area (ceiling region) of an aircraft, it is currently customary to connect components, such as, for example, electrical or electronic component parts, components of the aircraft air conditioning installation or other aircraft systems, ceiling trim panels, lighting elements and the like, to the aircraft structure individually. In a similar manner, pipelines serving, for example, as air-conducting lines belonging to the aircraft air conditioning installation or to the water supply in an aircraft cabin, as well as electrical lines, are currently also fastened to the aircraft structure individually. Since each component part has to be positioned separately and fastened to the aircraft structure sequentially, the mounting of these component parts is very time-consuming. In addition, many interfaces between the individual components and the primary structure of the aircraft are created, for which suitable adaptation of said primary structure is necessary and for which various holders have to be held in stock. Customers' individual requirements as regards the supplying and positioning of aircraft system components in the crown area of an aircraft thus have to be already taken into account in the course of assembling the structure. Furthermore, specially coordinated integration of aircraft system components which have been selected, designed or positioned in accordance with customers' specific wishes, with adjacent component parts, such as insulation packs or structural connections for example, is required.

After the mounting operation it is necessary, in the course of final inspection, to check that all the components and lines are functioning properly. In particular, all the pipelines have to be subjected to testing for freedom from leaks, while checking of all the interfaces is necessary in the case of the electrical lines. These tests likewise entail a relatively high outlay, since the lines and interfaces to be tested are often accessible only with difficulty when the lines are in the mounted condition.

In order to address these problems, DE 10 2010 055 962, which has not been previously published, proposes using, for the purpose of mounting aircraft system components in the crown area of an aircraft, a carrier module for aircraft system components which has a carrier element which is arcuate, at least in certain sections, said carrier element being arranged so as to extend, when the carrier module for aircraft system components is in the mounted condition in an aircraft, at least in certain sections substantially towards the ribs of an aircraft structure, over at least one section of a ceiling region of an aircraft cabin. The carrier module for aircraft system components further comprises a transverse carrier element which is arranged so as to extend, when the carrier module for aircraft system components is in the mounted condition in an aircraft, substantially perpendicularly to a longitudinal axis of the aircraft cabin. A structure holder serves for fastening the carrier module for aircraft system components to the aircraft structure, and at least one aircraft system component can be fastened to said carrier module for aircraft system components by means of an aircraft system components holder.

An aircraft system component which is to be mounted in the ceiling region of an aircraft cabin can be conveniently connected, outside the aircraft, to the carrier module for aircraft system components which is described in DE 10 2010 055 962. Said carrier module for aircraft system components can then be fastened, with the aircraft system components fastened to it, to the aircraft structure element of the upper shell of the aircraft fuselage in a simple and convenient manner by means of the structure holder. A standardized holder can be used as the structure holder.

SUMMARY OF THE INVENTION

An object towards which the invention is directed is to provide a system and also a method which make it possible to mount a large number of aircraft system components, and in particular a large number of electrical lines, in the crown area of an aircraft in a time-saving and thereby cost-saving manner.

A system according to the invention for mounting aircraft system components in the crown area of an aircraft comprises a first longitudinal carrier element, a second longitudinal carrier element and a bridging element which connects said first longitudinal carrier element to said second longitudinal carrier element. The general term "aircraft system components" is understood, here, to mean aircraft system components which are constructed in the form of electrical lines, but also any other aircraft system components, such as, for example, pipelines, electrical or electronic components or other components. The system is mountable in the crown area of an aircraft in such a way that the first and the second longitudinal carrier element extend substantially parallel to a longitudinal axis of the aircraft. On the other hand, when the system is in the mounted condition in an aircraft, the bridging element that connects the longitudinal carrier elements to one another preferably extends substantially perpendicularly to the longitudinal axis of the aircraft.

The longitudinal carrier elements may be of any desired length. For example, said longitudinal carrier elements may be so dimensioned that, when the system is mounted in the crown area of an aircraft, they extend over a number of rib bays along the longitudinal axis of the aircraft. However it is also conceivable to provide longitudinal carrier elements which extend, when the system is mounted in the crown area of an aircraft, substantially over the entire length of an aircraft cabin along the longitudinal axis of the aircraft. The longitudinal carrier elements and the bridging element of the system according to the invention are preferably positioned, relative to one another, in such a way that the bridging element spans an intervening space between the longitudinal carrier elements. When mounted in the crown area of an aircraft, said longitudinal carrier elements preferably extend downwards from the bridging element towards a floor of an aircraft cabin.

A plurality of cable ducts for accommodating electrical lines is provided on the first and/or the second longitudinal carrier element. Electrical lines may be routed through the aircraft, parallel to its longitudinal axis, in the region of the crown area of said aircraft, along the cable ducts which are provided on the first and/or the second longitudinal carrier element. However it is possible to already mount the electrical lines in the cable ducts, outside the aircraft, before the system is installed in the crown area of the aircraft with the electrical lines accommodated in said cable ducts. This makes the laying of electrical lines in the crown area of an aircraft considerably easier. In addition, the electrical lines can already be at least partially tested, outside the aircraft. This makes it possible to bring about further savings in terms of time and cost.

Because of the disposition of the electrical lines in the cable ducts of the first and/or the second longitudinal carrier element, it is possible to dispense with providing individual holders for fastening said electrical lines to the primary structure of the aircraft. Not only is the mounting of the electrical lines in the crown area of the aircraft simplified as a result of this; what is more, the standardized fastening of the electrical lines in the cable ducts of the longitudinal carrier elements permits more flexible adaptation of the configuration of the aircraft system components to requirements which are specific to the customers. In addition, reconfiguring or modifying measures can be carried out more easily. Finally, weight savings can be brought about by using the system according to the invention, as a result of dispensing with individual structure holders for fastening the electrical lines to the primary structure of the aircraft, and the number of cold-conducting bridges can be reduced because of the optimized design involving simply fewer structural connections for fastening the system as a whole to the aircraft structure.

The first longitudinal carrier element preferably comprises a main body having a first main surface that faces towards the second longitudinal carrier element and also a second main surface that faces away from said second longitudinal carrier element. Cable ducts provided on the first longitudinal carrier element may be disposed both in the region of the first main surface and in the region of the second main surface of the main body of the first longitudinal carrier element. In addition or as an alternative to this, the second longitudinal carrier element may comprise a main body having a first main surface that faces towards the first longitudinal carrier element and also a second main surface that faces away from said first longitudinal carrier element. Cable ducts provided on the second longitudinal carrier element are preferably disposed both in the region of the first main surface and in the region of the second main surface of the main body of the second longitudinal carrier element. Such a configuration of the longitudinal carrier elements permits the space-saving disposition of a large number of electrical lines in the cable ducts provided on said longitudinal carrier elements.

At least some of the cable ducts provided on the first and/or the second longitudinal carrier element are preferably defined by separating elements which keep the electrical lines accommodated in the cable ducts at a predetermined distance from one another. The separating elements thus prevent an electrical line from coming into contact with an adjacent electrical line in the event of damage. The separating elements preferably extend from the main surfaces of the main bodies of the first and/or the second longitudinal carrier element.

The main body of the first longitudinal carrier element is preferably shaped in such a way, and/or the separating elements of said first longitudinal carrier element are preferably shaped and positioned in such a way, that the mounting of an electrical line in a cable duct of the first longitudinal carrier element, and/or the demounting of an electrical line from a cable duct of the first longitudinal carrier element, is not hindered by other electrical lines accommodated in the other cable ducts of said first longitudinal carrier element. As an alternative or in addition to this, the main body of the second longitudinal carrier element is preferably shaped in such a way, and/or the separating elements of said second longitudinal carrier element are preferably shaped and positioned in such a way, that the mounting of an electrical line in a cable duct of a second longitudinal carrier element, and/or the demounting of an electrical line from a cable duct of the second longitudinal carrier element, is not hindered by other electrical lines accommodated in the other cable ducts of said second longitudinal carrier element.

Such a configuration of the first and/or the second longitudinal carrier element simplifies not only the mounting of the electrical lines in the cable ducts of the first and/or the second longitudinal carrier element, but simplifies, in particular, the maintenance of the electrical lines when the system according to the invention is mounted, with the electrical lines accommodated in the cable ducts of the first and/or the second longitudinal carrier element, in the crown area of an aircraft.

The first and/or the second longitudinal carrier element is/are preferably dimensioned in such a way, and/or preferably comprise such a material, that electromagnetic screening of electrical lines accommodated in the cable ducts of the first and/or the second longitudinal carrier element is guaranteed. Longitudinal carrier elements which are configured in this way fulfil the double function of, on the one hand, serving as carrier elements for electrical lines which are to be laid in the crown area of an aircraft and of, at the same time, ensuring electromagnetic screening of the said electrical lines. This makes it possible to dispense with additional screening elements, for example sleeves or the like which accommodate the electrical lines.

Proper electromagnetic screening of the electrical lines accommodated in the cable ducts of the first and/or the second longitudinal carrier element can be brought about through the fact that said first and/or said second longitudinal carrier element is/are provided with a suitable mass of an electrically conductive material, in particular of a metal. In order to achieve this, the first and/or the second longitudinal carrier element may have a layer made of an electrically conductive material, for example a metal, in particular aluminum, which is applied to at least partial regions of the surface of the first and/or the second longitudinal carrier element. A metallic surface coating of the longitudinal carrier elements permits proper electromagnetic screening of electrical lines accommodated in the cable ducts of said longitudinal carrier elements, but at the same time makes it possible to design said longitudinal carrier elements so as to be as light in weight as possible. The layer comprising an electrically conductive material may be applied in the region of the main surfaces of the main body of the longitudinal carrier elements and/or in the region of the separating elements belonging to said longitudinal carrier elements.

The system according to the invention for mounting aircraft system components in the crown area of an aircraft preferably further comprises at least one component holder for fastening at least one aircraft system component which is not constructed in the form of an electrical line, to the bridging element. Said aircraft system component which is not constructed in the form of an electrical line may be, for example, an electrical or electronic component or any other component which is to be installed in the crown area of an aircraft.

Basically, it is possible to equip the system according to the invention for mounting aircraft system components in the crown area of an aircraft with just one bridging element which connects the two longitudinal carrier elements to one another. Particularly if, however, the longitudinal carrier elements are dimensioned in such a way that they extend, when the system is mounted in the crown area of an aircraft, over an appropriate length parallel to the longitudinal axis of the aircraft, the system comprises a plurality of bridging elements which are disposed one behind another, viewed in the direction of the longitudinal axis of the aircraft, and are connected to the longitudinal carrier elements. It is then possible to fasten to the bridging elements, by means of suitable component holders, a large number of aircraft system components which are not constructed in the form of an electrical line but which are intended for mounting in the crown area of an aircraft. In addition, aircraft system components which are not constructed in the form of an electrical line may also, if necessary, be mounted on a number of bridging elements.

Aircraft system components which are to be fastened to the bridging elements of the system according to the invention but which are not constructed in the form of an electrical line may also be already pre-mounted, outside the aircraft, on the bridging element in a manner similar to the electrical lines. Consequently, it is no longer necessary to mount the aircraft system components individually on the primary structure of the aircraft. Under these circumstances, savings in terms of time and cost can likewise be brought about in the mounting of the aircraft system components, as can a higher degree of flexibility which simplifies the carrying-out of customers' individual requirements.

The component holder is preferably adapted to fasten the aircraft system component which is not constructed in the form of an electrical line to the bridging element at such a position that the mounting of said aircraft system components on said bridging element, and/or the demounting of said aircraft system components from said bridging element, is not hindered by the longitudinal carrier elements and electrical lines accommodated in the cable ducts of said longitudinal carrier elements. Such a configuration of the system according to the invention for mounting aircraft system components in the crown area of an aircraft simplifies, in particular, the maintenance of individual aircraft system components which are not constructed in the form of an electrical line, since the replacement or repair of an individual aircraft system component which is not constructed in the form of an electrical line can be carried out without any difficulty and without it being necessary, for this purpose, to demount other components, in particular electrical lines.

There is preferably provided, on the bridging element, at least one cable duct for accommodating at least one electrical line. The cable duct provided on the bridging element preferably serves to accommodate an electrical line which is intended to be laid in the crown area of an aircraft, substantially perpendicularly to the longitudinal axis of the aircraft. In a manner similar to the cable ducts provided on the longitudinal carrier elements, the cable duct provided on the bridging element also makes it possible to pre-mount on the bridging element, outside the aircraft, the electrical line to be disposed in the cable duct, and also to dispense with individual structure holders for fastening said electrical line to the primary structure of the aircraft.

The cable duct provided on the bridging element is preferably disposed in the region of a surface of said bridging element that faces away from the longitudinal carrier elements. As a result of this, an electrical line which is laid in the cable duct of the bridging element is kept at a desired distance from electrical lines disposed in the cable ducts of the longitudinal carrier elements.

In addition, the bridging element is preferably so dimensioned, and/or comprises such a material, that electromagnetic screening of an electrical line accommodated in the cable duct of the bridging element is guaranteed. When the system according to the invention is configured in this way, the bridging element also fulfils the double function of, on the one hand, serving as a carrier element for an electrical line which is to be laid in the crown area of an aircraft, substantially perpendicularly to the longitudinal axis of the aircraft, and of, at the same time, ensuring proper electromagnetic screening of the said electrical line. A proper electromagnetic screening action of the bridging element may be brought about, for example, through the fact that said bridging element is made of an electrically conductive material, in particular metal such as, for example, aluminum.

A clamping device may be disposed in the cable ducts provided on the first and/or the second longitudinal carrier element and/or in the cable duct provided on the bridging element. Said clamping device may comprise, for example, an elastic plastic material and permit "latching engagement" of an electrical line in a cable duct. If desired, an electrical line which is fastened by means of a clamping device in a cable duct of a longitudinal carrier element or of the bridging element may be additionally secured in its position by suitable cable ties.

The system according to the invention for mounting aircraft system components in the crown area of an aircraft preferably further comprises at least one structure holder for fastening the system to an aircraft structure element. Said aircraft structure element may be, for example, a rib of the primary structure of the aircraft. The structure holder preferably comprises a connecting element which is provided with a bore and is intended for connection to a longitudinal carrier element or to the bridging element of the system according to the invention for mounting aircraft system components in the crown area of an aircraft, and also for connection to an aircraft structure element, in particular to a rib of the primary structure of the aircraft. Furthermore, the structure holder may comprise a fastening arrangement which is intended to pass through the bore constructed in the connecting element and also through a bore constructed in the aircraft structure element. The fastening arrangement preferably comprises a pin which is accommodated in a sleeve comprising an elastic material. The pin accommodated in the sleeve can be fixed, by means of a nut and a corresponding holder, in a position in which it passes through the bores provided in the connecting element and the aircraft structure element. The sleeve comprising an elastic material ensures compensation for tolerances because of its elastic deformability.

In a method according to the invention for mounting aircraft system components in the crown area of an aircraft, a first longitudinal carrier element is provided. In addition, a second longitudinal carrier element is provided. Electrical lines are disposed in a plurality of cable ducts which are provided on the first and/or the second longitudinal carrier element. The first and the second longitudinal carrier element are connected to a bridging element. Connection of the longitudinal carrier elements to the bridging element preferably takes place only after the installation of the electrical lines in the cable ducts of the first and/or the second longitudinal carrier element. Finally, the system is mounted in the crown area of an aircraft in such a way that the first and the second longitudinal carrier element extend substantially parallel to a longitudinal axis of said aircraft.

Before the system is mounted in the crown area of an aircraft, at least one aircraft system component which is not constructed in the form of an electrical line is preferably fastened to the bridging element. The fastening of the aircraft system component which is not constructed in the form of an electrical line to the bridging element preferably takes place in such a position that the mounting of said aircraft system component which is not constructed in the form of an electrical line, on said bridging element, and/or the demounting of said aircraft system component which is not constructed in the form of an electrical line, from said bridging element, is not hindered by the longitudinal carrier elements and electrical lines accommodated in the cable ducts of said longitudinal carrier elements. If desired, at least one aircraft system component which is not constructed in the form of an electrical line may also be fastened to the first and/or the second longitudinal carrier element.

The system is preferably positioned, when the at least one aircraft system component is mounted on the bridging element, in such a way that said aircraft system component can be fastened to said bridging element from above. For example, the system, i.e., the longitudinal carrier elements and the bridging element, may be supported, when the aircraft system component is mounted on said bridging element, in such a way that the longitudinal carrier elements extend upwards from the bridging element, so that a surface of the bridging element that faces towards the floor of the aircraft cabin when the system is mounted in the crown area of an aircraft is conveniently accessible from above. After the aircraft system component has been fastened to the bridging element, the system, with the aircraft system component fastened to said bridging element, is preferably rotated by about 180°, prior to being mounted on the crown area of an aircraft, into a final mounting position in which the longitudinal carrier elements extend downwards from the bridging element towards a floor of an aircraft cabin.

In a preferred embodiment of the method according to the invention, at least one electrical line is disposed in a cable duct which is disposed on the bridging element, preferably in the region of a surface of said bridging element that faces away from the longitudinal elements.

At least one electrical line may be fastened by means of a clamping device which is disposed in the cable ducts provided on the first and/or the second longitudinal carrier element and/or in the cable duct provided on the bridging element.

Before being mounted in an aircraft, the system according to the invention may also be pre-assembled with an aircraft structure element, for example a rib or an upper shell of the aircraft fuselage, or with a number of structure elements of an upper shell of the aircraft fuselage, to form a subassembly that can be handled independently. The integration of a system for mounting aircraft system components in the crown area of an aircraft with structure elements belonging to an upper shell of an aircraft fuselage in the course of pre-assembly is described in DE 10 2010 055 995, which has not been previously published.

BRIEF DESCRIPTION OF THE DRAWINGS

A preferred embodiment of the invention will now be explained in greater detail with the aid of the appended schematic drawings, in which:

FIGS. 3a and b show detail views of a first longitudinal carrier element of the system according to FIG. 1;

FIG. 4 shows a sectional view of the first, and of a second, longitudinal carrier element of the system according to FIG. 1;

FIGS. 6 to 12 show the various steps in a method for mounting aircraft system components in the crown area of an aircraft using a system according to FIG. 1;

DETAILED DESCRIPTION OF THE PREFERRED EMBODIMENTS

Figure 1:
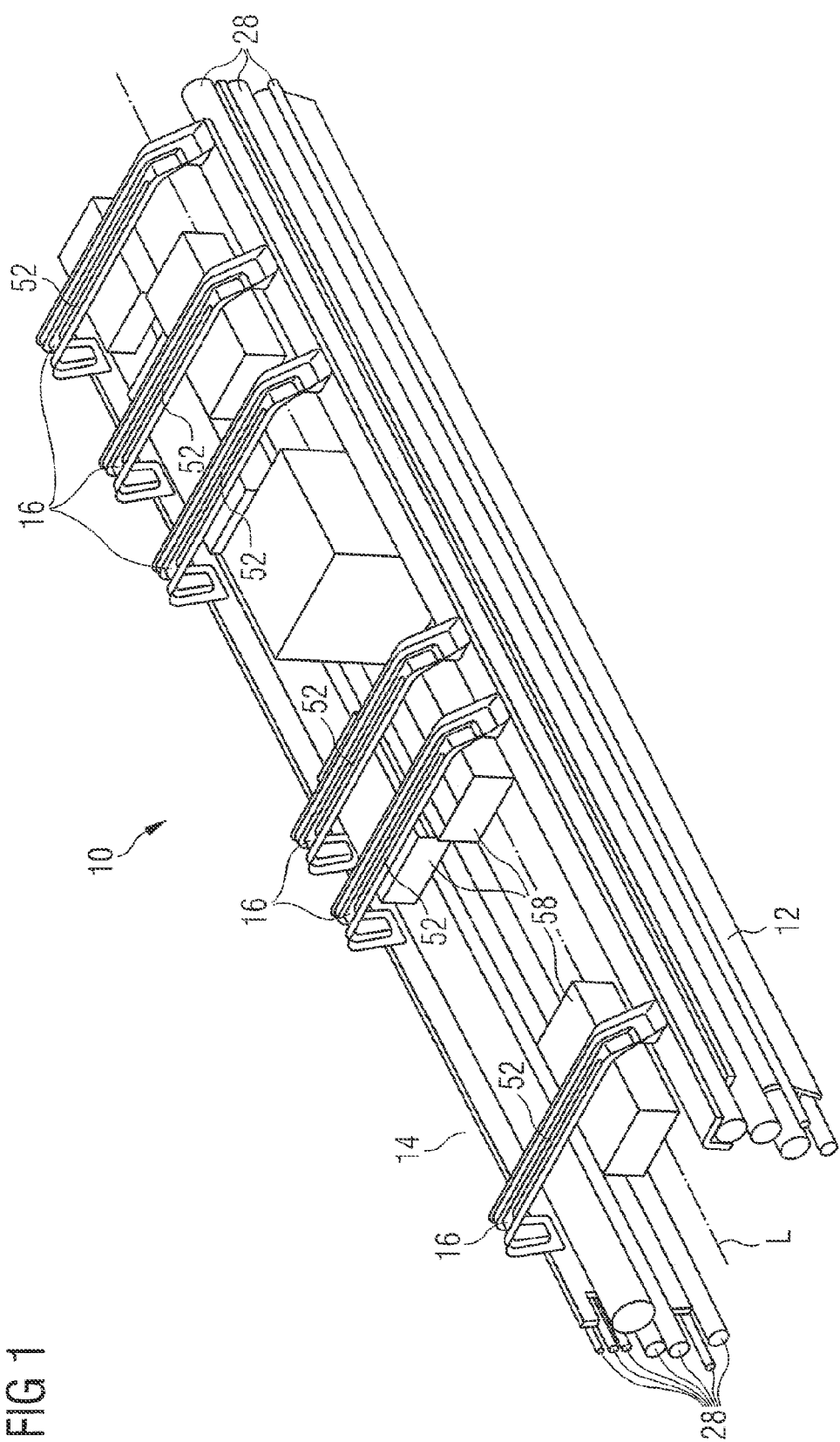
FIG. 1 shows a three-dimensional view of a system for mounting aircraft system components in the crown area of an aircraft.
Figure 2:
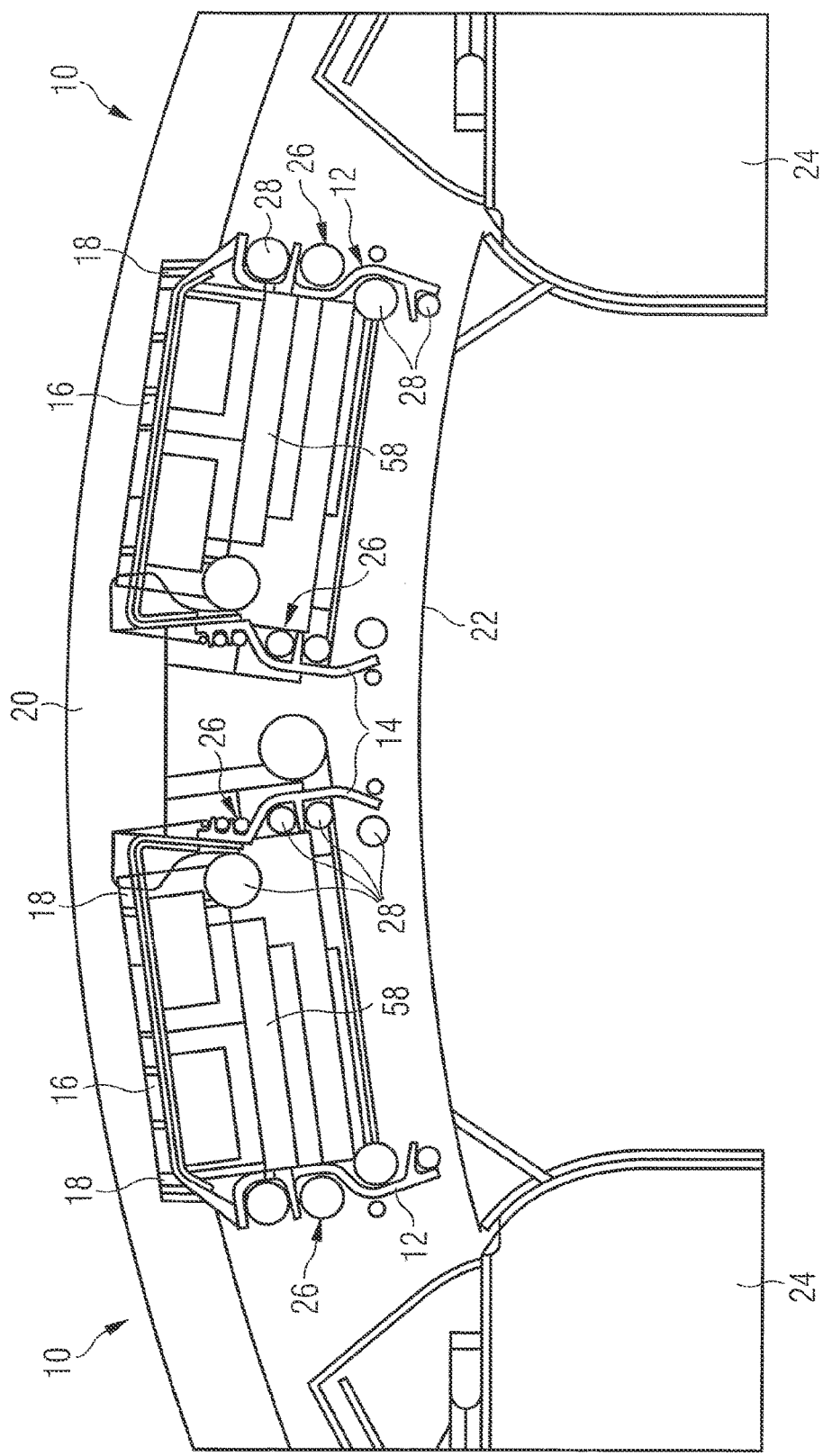
FIG. 2 shows a front view of the system according to FIG. 1, in the mounted condition in the crown area of an aircraft.

A system 10 which is illustrated in FIGS. 1 and 2 is used for mounting aircraft system components in the crown area of an aircraft. Said system 10 comprises a first longitudinal carrier element 12 and also a second longitudinal carrier element 14 which is disposed substantially parallel to said first longitudinal carrier element 12 and at a distance from the latter. The longitudinal carrier elements 12, 14 are connected to one another by a plurality of bridging elements 16.

In the representation according to FIG. 2, two systems 10 are mounted in the crown area of an aircraft in such a way that the longitudinal carrier elements 12, 14 extend substantially parallel to a longitudinal axis L of the aircraft. The bridging elements 16, on the other hand, are oriented substantially perpendicularly to the longitudinal axis L of the aircraft. The longitudinal carrier elements 12, 14 extend from the bridging element 16 towards a floor, which is not illustrated in FIG. 2, of an aircraft cabin. Each system 10 is fastened, by a number of structure holders 18, to a number of aircraft structure elements 20 which are disposed one behind another along the longitudinal axis L of the aircraft and which are constituted, in the representation according to FIG. 2, by ribs of the primary structure of the aircraft which are disposed, viewed along the longitudinal axis L of the aircraft, one behind another. When the system 10, as shown in FIG. 2, is installed in the crown area of an aircraft, the mounting region of the system 10 is bounded, in the downward direction, by ceiling panels 22. Luggage compartments 24 are provided along the lateral edges of the ceiling panels 22.

A plurality of cable ducts 26 is provided on each of the first and the second longitudinal carrier element 12, 14. Said cable ducts 26 serve to accommodate electrical lines 28. As can be gathered, in particular, from the detail representations in FIGS. 3a and 4, the first longitudinal carrier element 12 comprises a main body 30 having a first main surface 30a that faces towards the second longitudinal carrier element 14 and also a second main surface 30b that faces away from said second longitudinal carrier element 14. Similarly, the second longitudinal carrier element 14 comprises a main body 32 having a first main surface 32a that faces towards the first longitudinal carrier element 12 and also a second main surface 32b that faces away from said first longitudinal carrier element 12.

Extending from the main faces 30a, 30b of the main body 30 of the first longitudinal carrier element 12 are separating elements 34 which define cable ducts 26 provided on said first longitudinal carrier element. Consequently, the cable ducts 26 provided on the first longitudinal carrier element 12 are disposed both in the region of the first main surface 30a of the main body 30 of said first longitudinal carrier element 12 and in the region of the second main surface 30b of said main body 30 of the first longitudinal carrier element. Similarly, separating elements 36 which define the cable ducts 26 provided on the second longitudinal carrier element 14 also extend from the main surfaces 32a, 32b of said second longitudinal carrier element 14. Thus the second longitudinal carrier element 14 is also provided with cable ducts 26, both in the region of the first main surface 32a and in the region of the second main surface 32b of its main body 32. The longitudinal carrier elements 12, 14 thus permit the mounting of a large number of electrical lines 28 in the crown area of an aircraft. The separating elements 34, 36 keep the electrical lines 28 accommodated in the cable ducts 26 at a desired distance from one another, so that, even in the event of one of said electrical lines 28 becoming damaged, the damaged electrical line is reliably prevented from coming into contact with another electrical line.

As can be gathered from the representation according to FIG. 4, the main bodies 30, 32 of the longitudinal carrier elements 12, 14 each comprise a sandwich-type component part which comprises a core 38 having a honeycomb structure. Applied to the core 38 is a surface layer 40 which may comprise, for example, a fiber-reinforced composite material or the like. Said core 38 may, for example, have a thickness of about 9.5 mm, whereas the surface layer 40 may have a thickness of about 0.25 mm. By designing the longitudinal carrier elements 12, 14 in such a way, it is possible to ensure that said longitudinal carrier elements 12, 14 are equal to the demands, in terms of structural mechanics, which are imposed upon them when the system 10 is mounted in the crown area of an aircraft. At the same time, longitudinal carrier elements 12, 14 which comprise a main body 30, 32 made of a sandwich-type material have a low weight.

The separating elements 34, 36 of the longitudinal carrier elements 12, 14 each have a base element 42 which may, for example, have a thickness of about 1 mm. The main bodies 30, 32 and the separating elements 34, 36 of the longitudinal carrier elements 12, 14 are provided, in certain regions, with a layer 44 made of an electrically conductive material, in particular aluminum. The layer 44 is, for example, 0.2 mm thick. Such a configuration of the longitudinal carrier elements 12, 14 guarantees proper electromagnetic screening of electrical lines 28 accommodated in the cable ducts 26 of the longitudinal carrier elements 12, 14. As a result, said longitudinal carrier elements 12, 14 are able to fulfil the double function of, on the one hand, serving as carrier elements for electrical lines 28 which are to be laid in the crown area of an aircraft and of, at the same time, ensuring proper electromagnetic screening of the said electrical lines 28. This makes it possible to dispense with additional screening elements, as a result of which savings in weight and cost are made possible.

As can be seen from the representation according to FIG. 3b, a clamping device 46 is disposed in each of the cable ducts 26 which are provided on the longitudinal carrier elements 12, 14. The clamping device 46 may comprise, for example, of an elastic plastic material and permits rapid mounting of the electrical lines 28 in the cable ducts 26 by "latching engagement" in said clamping device 46. The electrical lines 28 may additionally be secured in their position in the cable ducts 26 by cable ties 48.

Figure 5:
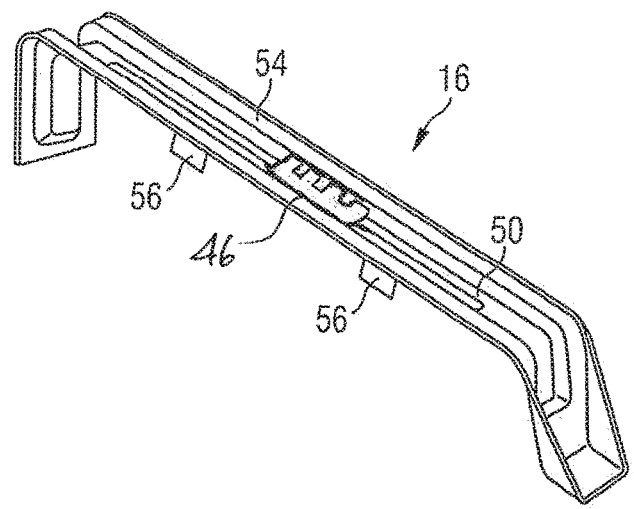
FIG. 5 shows a detail view of a bridging element of the system according to FIG. 1.

As can be seen, in particular, from FIG. 5, each bridging element 16 is also provided with a cable duct 50. A cable duct 50 provided on a bridging element 16 serves to accommodate an electrical line 52 (see FIG. 1) which is intended for installation in the crown area of an aircraft, substantially perpendicularly to the longitudinal axis L of the aircraft. The cable duct 50 is disposed in the region of a surface 54 of the bridging element 16 that faces away from the longitudinal carrier elements 12, 14, as a result of which an electrical line 52 laid in the cable duct 50 is kept at a desired distance from the electrical lines 28 laid in the cable ducts 26 of the longitudinal carrier elements 12, 14.

The bridging element 16 comprises, for example, a metal, in particular of aluminum. This guarantees that said bridging element 16 is equal to the demands imposed upon it, in terms of structural mechanics, but at the same time is able to fulfil the double function of also ensuring electromagnetic screening of an electrical line 52 accommodated in the cable duct 50. A clamping device 46, such as is illustrated in FIG. 3b, is likewise disposed in the cable duct 50 of the bridging element 16 as partially shown in FIG. 5. In addition, the electrical line 52 accommodated in the cable duct 50 of the bridging element 16 may also be secured in its position in said cable duct 50 by cable ties 48 which are shown in FIG. 3b.

The system 10 further comprises a plurality of component mountings 56 which are indicated merely diagrammatically in FIG. 5 and which serve to fasten aircraft system components 58 which are not constructed in the form of electrical lines, to the bridging element 16. In addition, other component holders, which are not illustrated in the drawings, may be provided, which serve to fasten aircraft system components 58 which are not constructed in the form of electrical lines, to the longitudinal carrier elements 12, 14.

Figure 6:
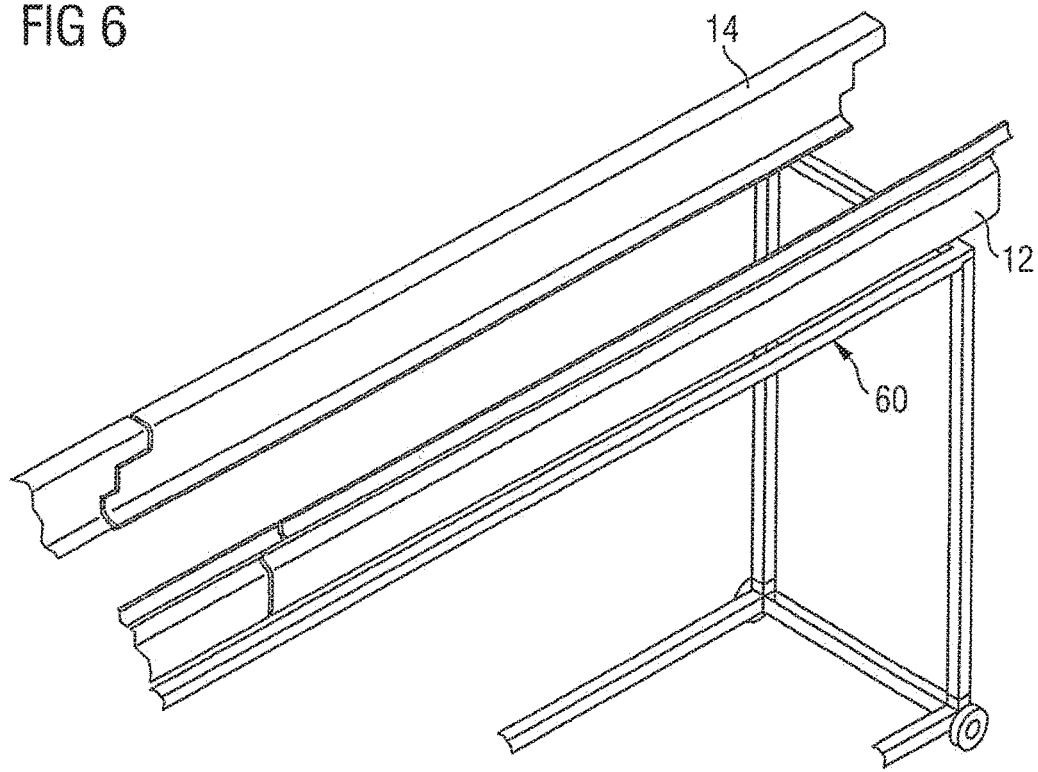
Figure 7:
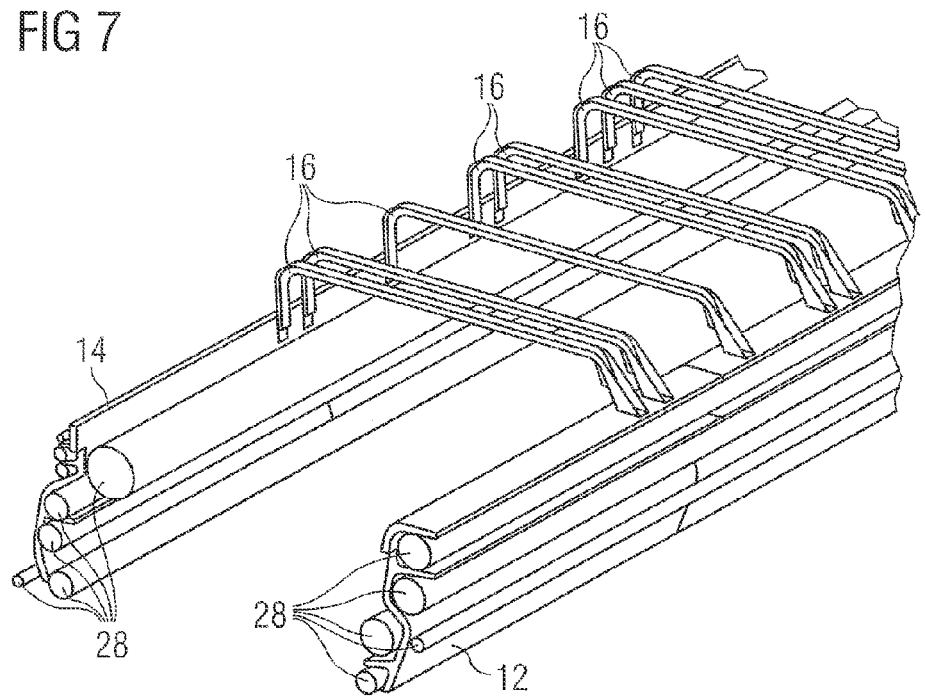

The mounting of aircraft system components which are constructed in the form of electrical lines 28, and also the mounting of aircraft system components 58 which are not constructed in the form of electrical lines, in the crown area of an aircraft with the aid of the system 10 will be explained below. In a first step, the longitudinal carrier elements 12, 14 are first of all provided and positioned, substantially parallel to one another and at a desired distance from one another, on a mounting frame 60; see FIG. 6. The electrical lines 28 are then mounted in the cable ducts 26 of the longitudinal carrier elements 12, 14 with the aid of the clamping devices 46 disposed in said cable ducts 26. After the installation of the electrical lines 28, the longitudinal carrier elements 12, 14 are connected to one another by the bridging elements 16, see FIG. 7.

Figure 8:
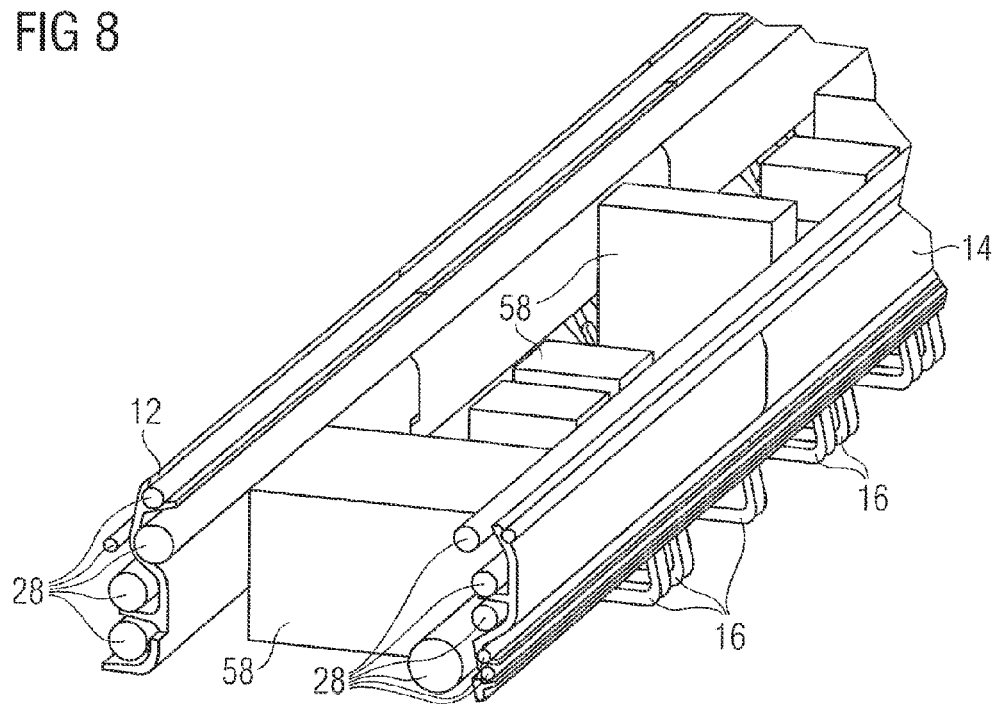
Figure 9:
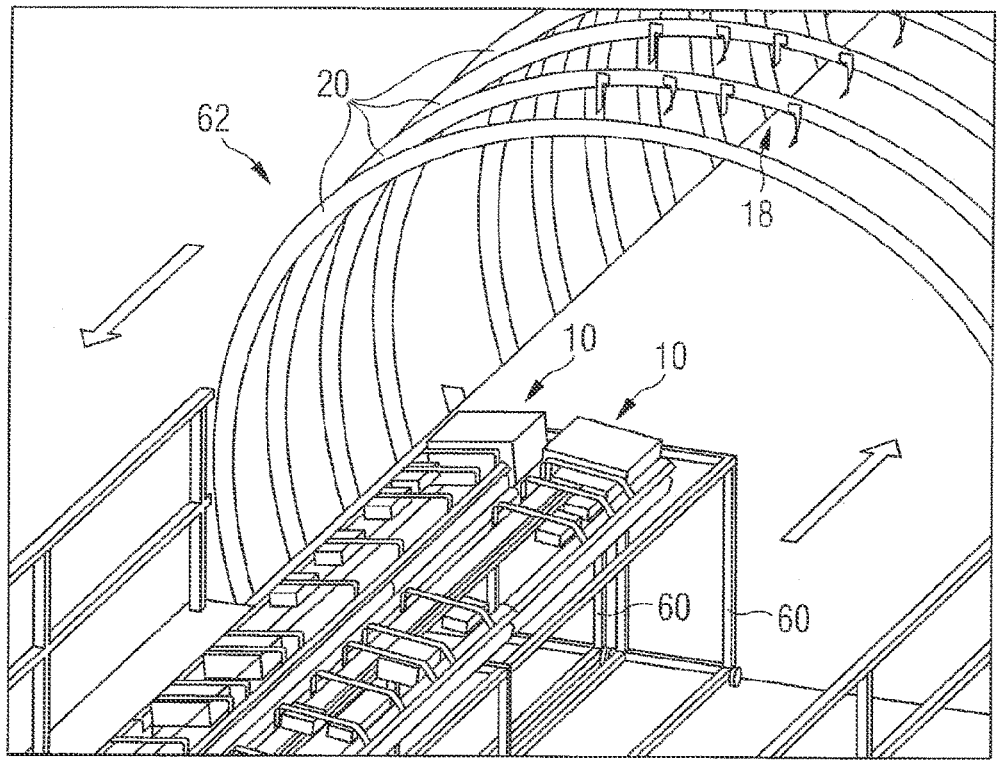
Figure 10:
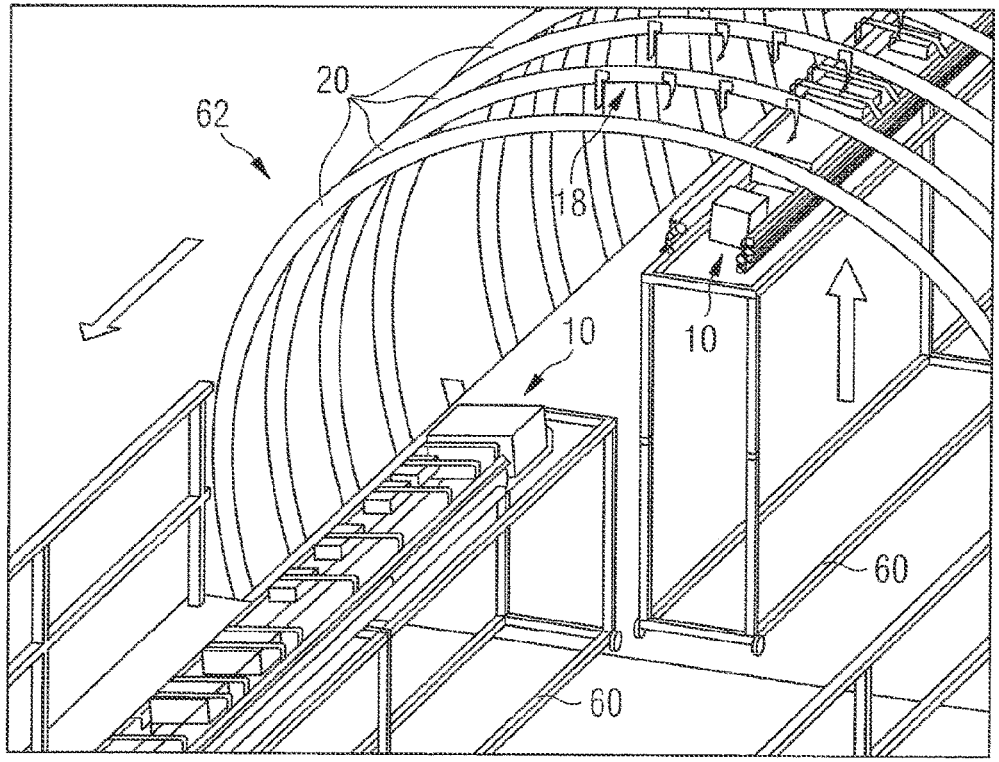

In the next step, the system 10 is rotated by 180°, so that the longitudinal carrier elements 12, 14 extend upwards from the bridging elements 16 as shown in FIG. 8. As a result of such a disposition of the system 10, the aircraft system components 58 which are to be fastened to the bridging elements 16 can be conveniently fastened to the latter from above by means of the component holders 56. In order to then be able to mount the system 10, with the electrical lines 28 and the other aircraft system components 58, in the crown area of an aircraft, the system 10 must be rotated by 180° again so that it assumes the position shown in FIG. 9. Functioning tests on the electrical lines 28 and the aircraft system components 58 are carried out before the final installation of the system 10 in the crown area of an aircraft.

The representations according to FIGS. 9 to 12 each show two systems 10 which are installed adjacent to one another in the crown area of an aircraft. For this purpose, the systems 10 are first of all moved into an element 62 of an aircraft fuselage, in a manner substantially parallel to the longitudinal axis L of the aircraft, by means of suitable mounting frames 60. As can be seen from FIGS. 10 to 12, the systems 10 are moved, one after the other, into their final mounting position within the element 62 of the aircraft fuselage and are fastened, by means of suitable structure holders 18, to a number of structural elements 20 of the aircraft which are disposed one behind another along the longitudinal axis L of the aircraft.

Figure 13:
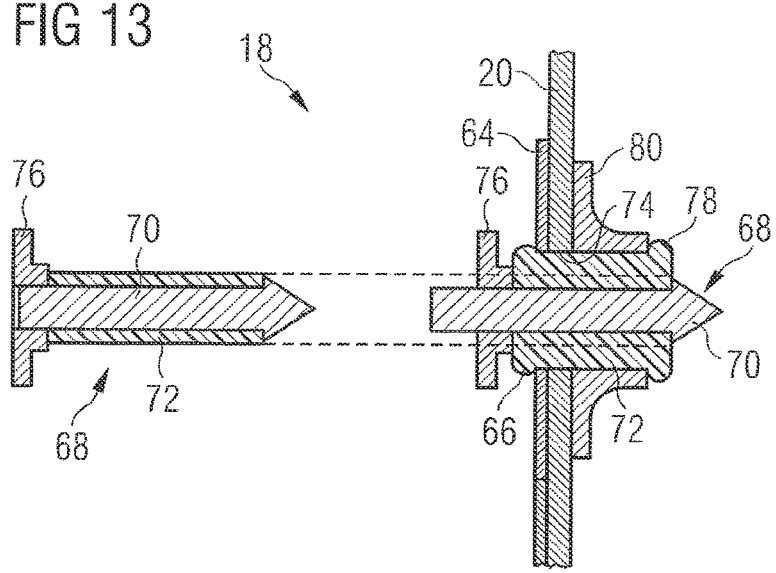
FIG. 13 shows a detail view of a structure holder for fastening the system according to FIG. 1 to an aircraft structure element.

Each structure holder 18 for fastening the system 10 to an aircraft structure element 20 comprises a connecting element 64, which is provided with at least one bore 66, and also a fastening arrangement 68, see FIG. 13. The fastening arrangement 68 comprises a pin 70 which is accommodated in a sleeve 72 comprising an elastically deformable material. In order to fasten the connecting element 64 to the structural element 20 of the aircraft, the pin 70 accommodated in the sleeve 72 passes through the bore in the connecting element 64 and also through a bore 74 constructed in said structural element 20 of the aircraft. The fastening arrangement 68 is fixed by means of a nut 76. The sleeve 72 is deformed by the nut 76, so that a flange 78 is produced on said sleeve 72. The flange 78 engages behind a holder 80 and thus ensures that the fastening arrangement 68 is securely fixed in its position.

Figure 14A:
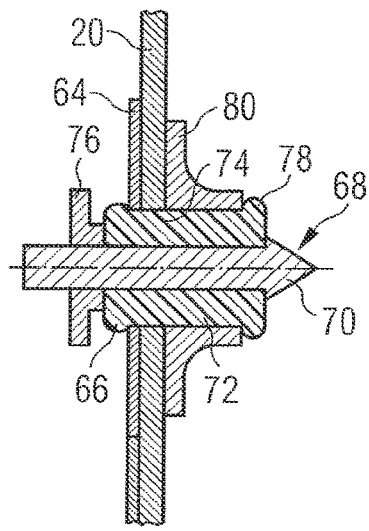
FIGS. 14a to c illustrate compensation for tolerances by means of the fastening arrangement according to FIG. 13.
Figure 14B:
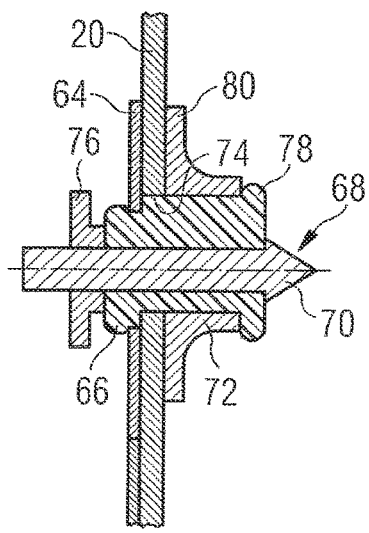
Figure 14C:
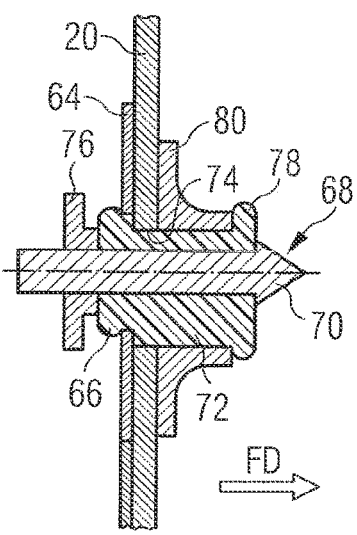

As can be seen from FIGS. 14a to 14c, a fastening arrangement 68 which is provided with a sleeve 72 made of an elastically deformable material makes it possible to compensate for tolerances. In particular, it is possible, because of the construction of the fastening arrangement 68, to compensate for tolerances in the bores 66, 74 in the connecting element 64 and the aircraft structure element 20, since the fastening arrangement 68 permits proper connection of the connecting element 64 to the aircraft structure element 20, even if the bores 66, 74 are not aligned in a congruent manner, see FIGS. 14b and 14c.

Figure 15:
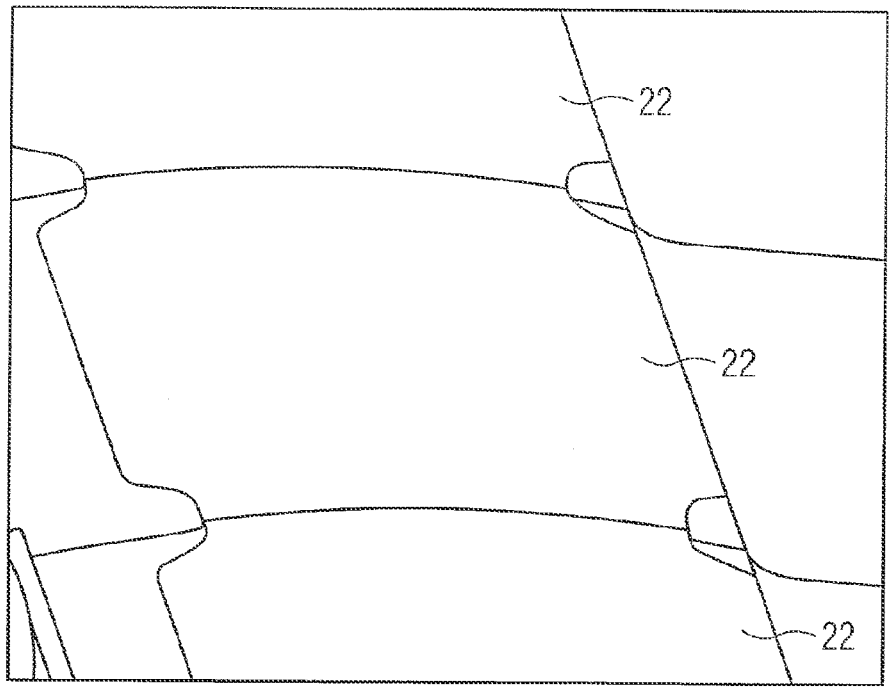
FIGS. 15 to 18 illustrate the demounting of individual aircraft system components which are mounted in the crown area of an aircraft by means of a system according to FIG. 1.
Figure 16:
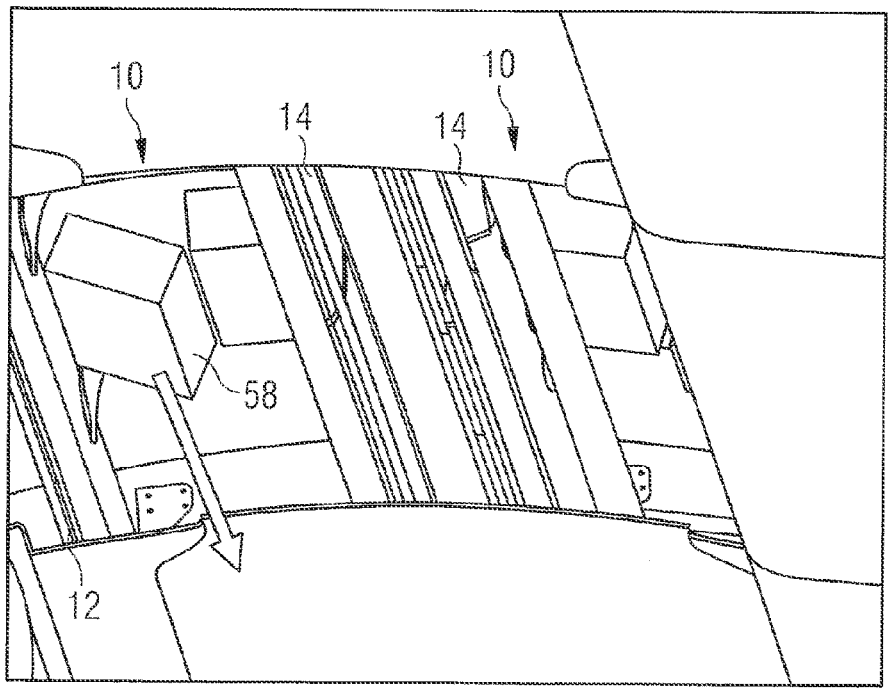

FIGS. 15 and 16 illustrate the demounting of an individual aircraft system component 58 from a system 10 installed in the crown area of an aircraft. In order to demount the aircraft system component 58, all that is necessary is to undo a ceiling panel 22 and then uninstall said aircraft system component 58. This is made possible by the shape and positioning of the longitudinal carrier elements 12, 14 relative to the bridging elements 16, and the positioning of the aircraft system component 58 relative to a bridging element 16. In particular, the configuration of the system 10 avoids electrical lines 28 extending, when the system 10 is installed in the crown area of an aircraft, underneath the aircraft system components 58 fastened to the bridging elements 16, and thereby hindering demounting of said aircraft system components 58.

Figure 17:
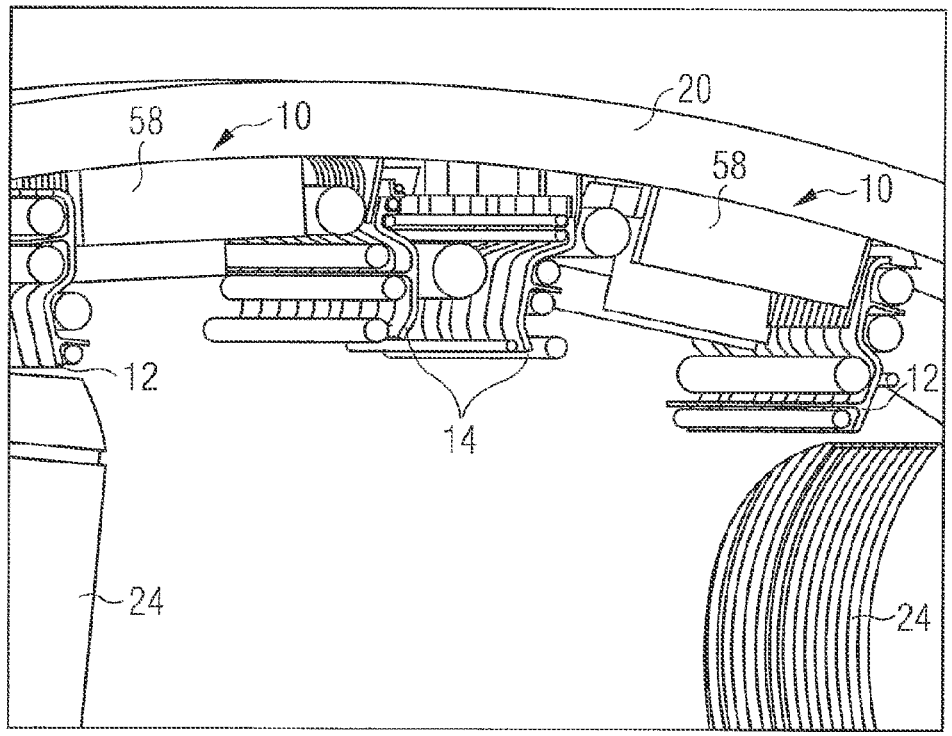
Figure 18:
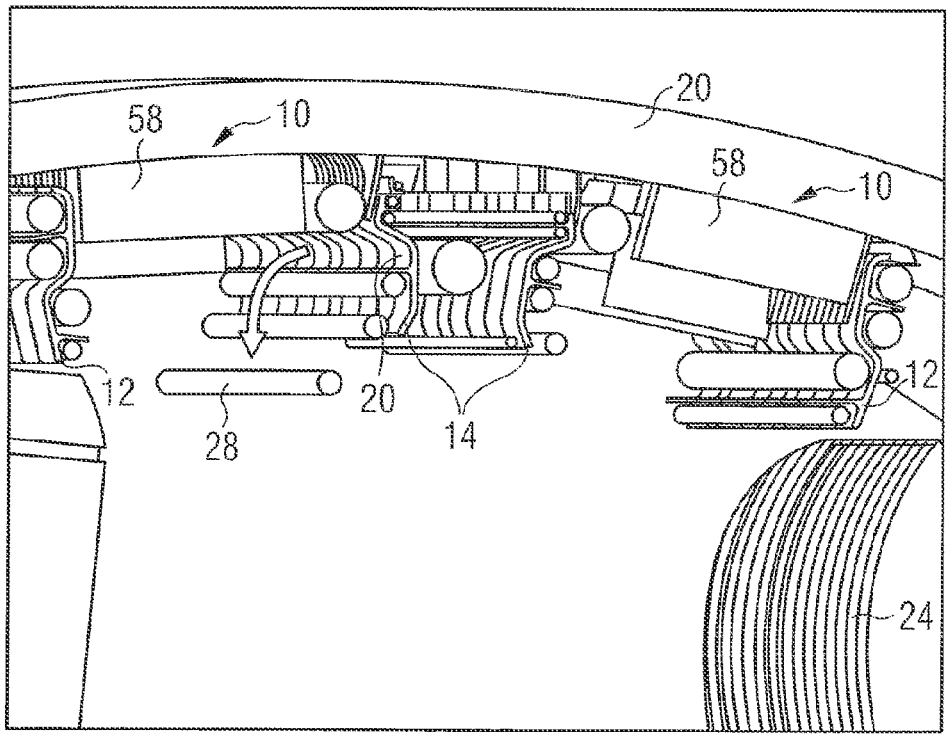

Similarly, FIGS. 17 and 18, which illustrate the demounting of an individual electrical line 28 from a cable duct 26 of a second longitudinal carrier element 14, show that the main bodies 30, 32 of the longitudinal carrier elements 12, 14 are shaped in such a way, and the separating elements 34, 36 of said longitudinal carrier elements 12, 14 are shaped and positioned in such a way, that the mounting or demounting of an individual electrical line 28 is not hindered by other electrical lines 28 which are disposed in the cable ducts 26 of the longitudinal carrier elements 12, 14.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A system for mounting aircraft system components in the crown area of an aircraft, said system comprising:
   a first longitudinal carrier element;
   a second longitudinal carrier element disposed substantially parallel to and at a distance from said first longitudinal carrier element; and
   a bridging element which connects the first longitudinal carrier element to the second longitudinal carrier element,
   wherein the system is mountable in the crown area of an aircraft in such a way that a longitudinal axis of each of the first and the second longitudinal carrier element extend substantially parallel to a longitudinal axis of the aircraft, and
   wherein a plurality of cable ducts for accommodating electrical lines is provided on at least one of the first and the second longitudinal carrier elements,
   wherein the first longitudinal carrier element comprises a main body having a first main surface and a second main surface, the first and second main surfaces forming an outer appearance of the first longitudinal carrier element and extending substantially parallel to the longitudinal axis of the first longitudinal carrier element, the first main surface facing towards the second longitudinal carrier element and the second main surface facing away from said second longitudinal carrier element, cable ducts provided on the first longitudinal carrier element being disposed both in the region of the first main surface and in the region of the second main surface of the main body of the first longitudinal carrier element.

2. The system according to claim 1, wherein the second longitudinal carrier element comprises a main body having a first main surface and a second main surface, the first and second main surfaces forming an outer appearance of the second longitudinal carrier element and extending substantially parallel to the longitudinal axis of the second longitudinal carrier element, the first main surface facing towards the first longitudinal carrier element and the second main surface facing away from said first longitudinal carrier element, cable ducts provided on the second longitudinal carrier element being disposed both in the region of the first main surface and in the region of the second main surface of the main body of the second longitudinal carrier element.

3. The system according to claim 1, wherein at least some of the cable ducts provided on at least one of the first and the second longitudinal carrier elements are defined by separating elements which keep the electrical lines accommodated in the cable ducts at a predetermined distance from one another.

4. The system according to claim 3, wherein the main body of the first longitudinal carrier element is shaped in such a way, and the separating elements of said first longitudinal carrier element are shaped and positioned in such a way, that the mounting of an electrical line in a cable duct of the first longitudinal carrier element, and the demounting of an electrical line from a cable duct of the first longitudinal carrier element, is not hindered by other electrical lines accommodated in the other cable ducts of said first longitudinal carrier element.

5. The system according to claim 3, wherein the main body of the second longitudinal carrier element is shaped in such a way, and the separating elements of said second longitudinal carrier element are shaped and positioned in such a way, that the mounting of an electrical line in a cable duct of the second longitudinal carrier element, and the demounting of an electrical line from a cable duct of the second longitudinal carrier element, is not hindered by other electrical lines accommodated in the other cable ducts of said second longitudinal carrier element.

6. The system according to claim 1, wherein at least one of the first and the second longitudinal carrier elements comprises an electromagnetically screening material.

7. The system according to claim 1, wherein at least one of the first and the second longitudinal carrier elements has a layer made of an electrically conductive material, in particular of aluminum, which is applied to at least partial regions of a surface of said first longitudinal carrier element.

8. The system according to claim 1, further comprising at least one component holder for fastening at least one aircraft system component which is not constructed in the form of an electrical line, to the bridging element, said component holder being adapted to fasten the aircraft system components to the bridging element at such a position that the mounting of said aircraft system component on said bridging element, and the demounting of said aircraft system component from said bridging element, is not hindered by the longitudinal carrier elements and electrical lines accommodated in the cable ducts of said longitudinal carrier elements.

9. The system according to claim 1, wherein at least one cable duct for accommodating at least one electrical line is provided on the bridging element, said cable duct being disposed in the region of a surface of said bridging element that faces away from the longitudinal carrier elements, and the bridging element comprising an electromagnetically screening material.

10. The system according to claim 9, wherein a clamping device is disposed in the cable duct provided on the bridging element.

11. The system according to claim 1, wherein a clamping device is disposed in the cable ducts provided on at least one of the first and the second longitudinal carrier elements.

12. The system according to claim 1, wherein at least one of the first and the second longitudinal carrier element has a layer made of an electrically conductive material, in particular of aluminum, which is applied to at least partial regions of a surface of said second longitudinal carrier element.

13. A system for mounting aircraft system components in the crown area of an aircraft, said system comprising:
a first longitudinal carrier element;
a second longitudinal carrier element; and
a bridging element which connects the first longitudinal carrier element to the second longitudinal carrier element,
wherein the system is mountable in the crown area of an aircraft in such a way that the first and the second longitudinal carrier element extend substantially parallel to a longitudinal axis of the aircraft, and
wherein a plurality of cable ducts for accommodating electrical lines is provided on at least one of the first and the second longitudinal carrier elements,
further comprising at least one structure holder for fastening the system to an aircraft structure element, said structure holder comprising a connecting element which is provided with a bore, and also a fastening arrangement, said fastening arrangement being intended to pass through the bore provided in the connecting element and also through a bore provided in the aircraft structure element, and said fastening arrangement comprising a pin which is accommodated in a sleeve comprising an elastically deformable material.

14. A method for mounting aircraft system components in the crown area of an aircraft, said method comprising the following steps:
providing a first longitudinal carrier element;
providing a second longitudinal carrier element disposed substantially parallel to and at a distance from said first longitudinal carrier element; and
connecting the first and the second longitudinal carrier element to a bridging element,
wherein the first longitudinal carrier element comprises a main body having a first main surface and a second main surface, the first and second main surfaces forming an outer appearance of the first longitudinal carrier element and extending substantially parallel to the longitudinal axis of the first longitudinal carrier element, the first main surface facing towards the second longitudinal carrier element and the second main surface facing away from said second longitudinal carrier element,
the method further comprising:
providing a plurality of cable ducts on at least the first longitudinal carrier element, the plurality of cable ducts being disposed both in the region of the first main surface and in the region of the second main surface of the main body of the first longitudinal carrier element;
arranging electrical lines in the plurality of cable ducts;
mounting the system in the crown area of an aircraft in such a way that a longitudinal axis of each of the first and the second longitudinal carrier elements extend substantially parallel to a longitudinal axis of the aircraft.

15. The method according to claim 14, wherein, before the system is mounted in the crown area of an aircraft, at least one aircraft system component which is not constructed in the form of an electrical line, is fastened to the bridging element, said aircraft system component being fastened to the bridging element in such a position that the mounting of said aircraft system component on said bridging element, and the demounting of said aircraft system component from said bridging element, is not hindered by the longitudinal carrier elements and electrical lines accommodated in the cable ducts of said longitudinal carrier elements.

16. The method according to claim 15, wherein the system is positioned, when the at least one aircraft system component is mounted on the bridging element, in such a way that said aircraft system component can be fastened to said bridging element from above, and the system, with the aircraft system component fastened to said bridging element, is rotated, prior to being mounted in the crown area of an aircraft, into a final mounting position in which the longitudinal carrier elements extend from the bridging element towards a floor of an aircraft cabin.

17. The method according to claim 14, wherein at least one electrical line is disposed in a cable duct which is disposed on the bridging element, in the region of a surface of said bridging element that faces away from the longitudinal carrier elements.

18. The method according to claim 14, wherein at least one electrical line is fastened by a clamping device which is disposed in a cable duct provided on at least one of the first and the second longitudinal carrier elements.

19. The method according to claim 14, wherein at least one electrical line is fastened by a clamping device which is disposed in the cable duct provided on the bridging element.

\* \* \* \* \*